Figure 1:
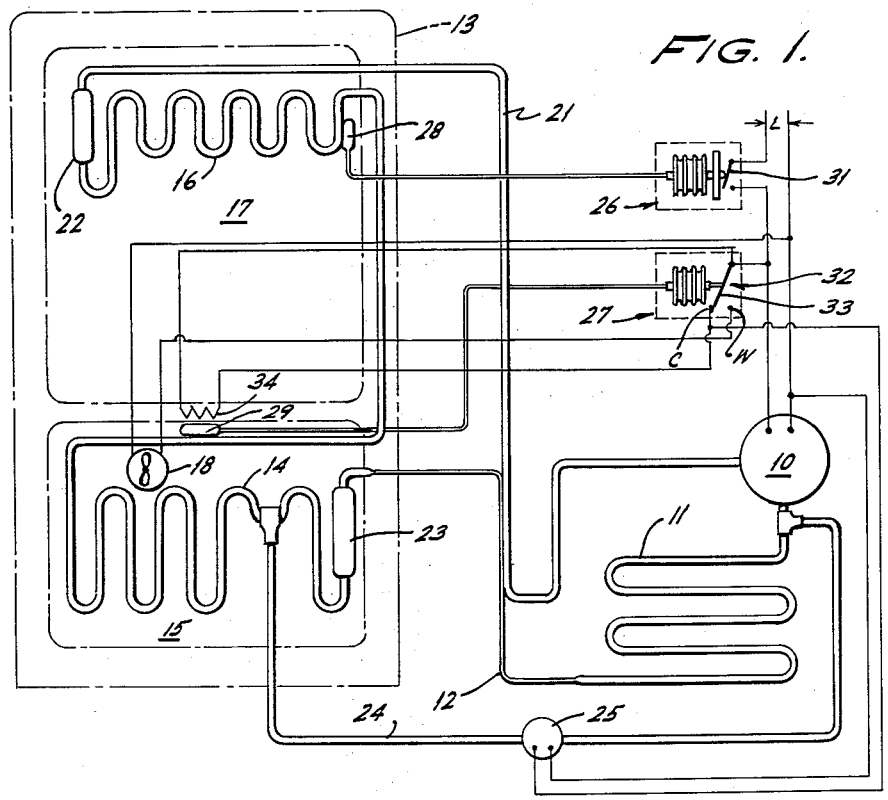

Jan. 21, 1964 W. G. MOCEY 3,118,287
REFRIGERATION SYSTEM INCLUDING DEFROST MEANS
Filed Dec. 15, 1961

INVENTOR.
WALTER G. MOCEY
BY
Harry W. Hargis III
AGENT

# United States Patent Office 3,118,287
Patented Jan. 21, 1964

3,118,287
REFRIGERATION SYSTEM INCLUDING
DEFROST MEANS
Walter G. Mocey, Philadelphia, Pa., assignor to Philco
Corporation, Philadelphia, Pa., a corporation of Delaware
Filed Dec. 15, 1961, Ser. No. 159,580
8 Claims. (Cl. 62—156)

This invention relates to refrigeration, and more particularly to means for automatically defrosting a refrigerator cooling element.

Refrigerator cooling elements have been defrosted by operating such elements cyclically between above-freezing and below freezing temperature limits, either on the principle of application of heat by natural heat-leakage in the normal course of operation thereof, or by the application of heat artificially to the cooling element at some time during the operating cycles. The latter means for defrosting has proven desirable for cooling elements adapted to maintain below-freezing temperatures of perishable foods, due to the rapidity of defrosting and consequent prevention of thawing of stored frozen foods.

It is a primary objective of this invention to provide simple, inexpensive and effective control means for achieving defrost of a cooling element during the operating cycles thereof, which means achieves optimum control of the above-mentioned desired rapid defrost.

A specific object of the invention is to provide simple and effective defrost means for the freezer compartment evaporator of a household refrigerator.

In achievement of the foregoing and other objectives, the invention proposes—in a refrigeration system including a defrostable cooling element adapted for cyclic operation and means for defrosting the cooling element—the use of control means for providing the defrosting periods advantageously in the course of each cycle of operation, and comprising: a first thermostatic element operative to energize and deenergize said cooling element to provide such cyclic operation; a defrosting control operative to energize said means for defrosting during a portion of the time when said first thermostatic element is conditioned to energize said cooling element, said defrosting control comprising a second thermostatic element having a bias heater associated therewith, said heater being energizable by simultaneous operation of said first thermostatic element to its refrigerating position and said second thermostatic element to its non-defrosting position upon completion of defrosting, whereby defrosting of the cooling element is halted, refrigeration is initiated, and subsequent movement of said second thermostatic element to its defrosting position is prevented.

It will be appreciated that the advantageous once-per-cycle defrost of a refrigerator is achieved by the cooperative heat exchange relation between a bias heater element and a defrost thermostat, whereby the only added heat is supplied to the thermostat, to maintain it in its non-defrosting position. In this way deenergization of the defrost means is maintained during the refrigeration period. Not until this period has ended is the bias heater element deenergized, whereupon the thermal mass of the cooling element, which is then at its lower temperature, is effective to reset the second thermostatic element to its defrosting position.

Figure 2:
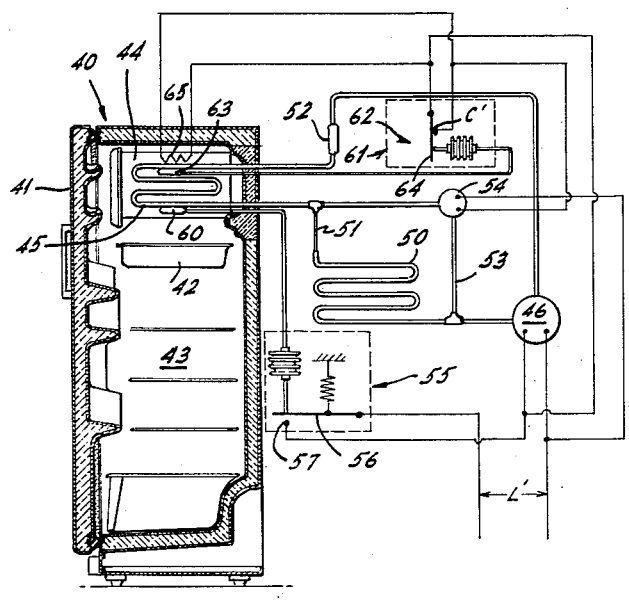

The foregoing as well as other objects and features of the invention, together with significant details of construction thereof, will be better understood from a consideration of the following description taken in conjunction with the accompanying drawing, in which:

FIGURE 1 is a diagrammatic representation of a refrigeration system disposed within a dual-compartment cabinet and including defrosting apparatus embodying the present invention; and FIGURE 2 is a diagrammatic representation of a modified refrigeration system disposed within a single-compartment cabinet and including defrosting apparatus embodying the present invention.

Now making detailed reference to the drawings, and first to FIGURE 1, it will be seen that the invention is embodied in a refrigeration system of a conventional dual evaporator type, said system having a motor compressor 10, a condenser 11, a continuously open restricted connection or capillary tube 12, a first evaporator 14 disposed in heat exchange relation with a freezing compartment 15 to be cooled, and a second evaporator 16 disposed in heat exchange relation with a food compartment 17 to be cooled, each said compartment being disposed in cabinet structure 13 diagrammatically represented by broken lines. The above elements are connected in series flow circuit through the agency of suitable conduits and connections including the capillary tube 12 and a suction line 21. A motor-driven fan means 18 is disposed within compartment 15 and is adapted to circulate air therein during each cooling or refrigerating period.

In accordance with common practice, an accumulator 22 is disposed in the circuit between the outlet of second evaporator 16 and suction line 21. Sump means 23 is disposed within compartment 15 and interconnects the outlet of capillary tube 12 with the evaporator 14.

Briefly, sump means 23 functions to control the flow of refrigerant in the circuit during hot gas defrost of the evaporator system, whereby to prevent overloading of the compressor. Structural features of this sump means, as well as of the particular hot gas defrost circuit illustrated by way of example, are disclosed and claimed in the copending application of Carroll J. Reber, Jr. Serial No. 848,008, filed October 22, 1959, now U.S. Patent No. 3,081,607, issued March 19, 1963, and assigned to the assignee of the present invention. However, the present invention is directed primarily to novel control means for effecting a defrost period during each cycle of a cooling or refrigerating operation, and it will therefore be understood that the means for applying heat to the evaporators may take other forms.

Additional elements of the refrigerating system comprise a bypass connection or conduit 24 which extends between the inlet of condenser 11 and the juncture of sump means 23 with the inlet of freezer evaporator 14. Bypass conduit 24 preferably is controlled by a normally closed, solenoid actuated valve 25.

During normal operation of the system, refrigerant is caused by motor compressor 10 to flow from condenser 11 through capillary tube 12, then through sump means 23 and into first evaporator 14. From first evaporator 14 the refrigerant flows into the second evaporator 16, through accumulator 22 and returns to motor compressor 10 by way of suction line 21.

When modified flow of refrigerant has been established within the system, by opening valve 25, hot gaseous refrigerant flows first to evaporators 14 and 16, bypassing condenser 11 and restrictor 12. Liquid refrigerant within evaporators 14 and 16 and accumulator 22 is replaced by hot gaseous refrigerant flowing through bypass conduit 24, such gaseous refrigerant being at an elevated temperature and giving up its heat to the relatively cold evaporators 14 and 16, with the result that some condensation occurs within the evaporators. This condensation of gaseous refrigerant takes place at a temperature, and corresponding pressure, just above 32° F. since the temperature cannot rise materially above this value until all of the frost has been melted from the evaporators, and particularly from the freezer evaporator 14. It will be understood that defrosting is accomplished by the aforesaid heat transfer which effects the condensation taking place within the evaporators.

Novel control means for providing the refrigerating and the defrosting periods of an operating cycle comprise a first thermostatic control element 26 disposed in heat exchange with evaporator 16, and a second thermostatic control element 27. Thermostatic element 26 comprises a switch 31 which is in series electrical circuit with the line L and motor compressor 10, and a temperature sensing bulb 28 disposed in heat exchange relation with evaporator 16. There is also disposed in series electrical circuit with thermostatic switch 31, and in parallel circuit with the motor compressor, a single-pole double-throw switch 32 of second thermostatic element 27, which element has a temperature sensing bulb 29 disposed in thermal exchange relation with evaporator 14. The switch arm 33 of switch 32 is connected in the electrical circuit at a point between motor compressor 10 and the first thermostatic element 26. The "warm" contact W of thermostatic switch 32 is connected to fan means 18 which also is connected to the line L as shown. The "cold" contact C of thermostatic switch 32 is connected to the solenoid actuated bypass valve 25, which also is connected to the line L as shown in the drawing. A bias heater element 34 is disposed in heat exchange relation with the control bulb 29 of thermostatic element 27, and is connected at one terminal thereof to contact C of switch 32 and at its other terminal to switch arm 33.

Considering now the operation of the above described apparatus, and first assuming that compressor operation has been initiated at a warm condition of the refrigerator, contacts of switch 31 of thermostatic element 26 are closed. Concurrently, thermostatic switch 32 of element 27 is in its "warm" position, that is, arm 33 engages contact W. In this position of switch 32, bias heater element 34 is energized by virtue of its series connection to line L with the solenoid coil of valve 25. It will be understood that the respective impedances of the solenoid coil and heater 34 are such that there is insufficient voltage drop across the coil to actuate the valve, yet there is enough voltage drop across heater 34 to activate the same. Element 34 applies sufficient heat to the bulb 29 of thermostatic element 27 to prevent thermostatic switch 32 from becoming reset to the "cold" position C as the compressor continues to operate. With the switch 32 in its "warm" position W, normally-closed bypass valve 25 is closed inasmuch as its solenoid coil is, for practical purposes, deenergized during the cooling or refrigerating period of the cycle. Also at this time, fan 18 is energized to enhance the heat exchange between foodstuffs in compartment 15 and evaporator 14.

After sufficient refrigeration has taken place, thermostatic switch 31 will open at its predetermined lower limit to deenergize motor compressor 10, and open the circuit to heater element 34 and fan 18. Deenergization of heater element 34 permits the "residual cold" of the evaporator to reset thermostatic switch 32 to its cold position C, which resetting provides a direct conductive path to the solenoid valve 25. Upon initiation of the next refrigerating cycle, which will occur when evaporator 16 and thermostatic element 26 have warmed up sufficiently to close switch 31 and energize motor-compressor 10, the normally closed solenoid operated bypass valve 25 will be energized and opened, by the application of full line voltage L to the solenoid coil. Hot gaseous refrigerant will then flow directly from compressor 10 to evaporators 14 and 16 to defrost the same and until such time as thermostatic switch 32 moves to its warm position W. Upon movement of switch 32 to its warm position, heater element 34 is energized to supply heat to sensing bulb 29 and maintain switch 32 in its warm position, and the normal refrigerating cycle proceeds, as described previously.

From the foregoing description, as well as from the following description of the invention as embodied in a single-evaporator, single-compartment refrigerator, it will be appreciated that the invention achieves periodic defrost by a novel combination of conventional thermostatic control elements and an auxiliary bias heater element both thermally and electrically associated with the control elements.

Turning now to the invention as illustrated also in FIGURE 2, an insulated cabinet 40 has a door 41 and a storage area separated by a baffle-like tray 42 into a food compartment 43 and a freezer compartment 44. An evaporator 45 is disposed within compartment 44 and is connected in conventional refrigerant flow circuit with a motor-compressor 46, condenser 50, capillary tube 51, and accumulator 52. Again, as in the embodiment shown in FIGURE 1, defrosting is achieved by causing hot gaseous refrigerant to flow directly from motor-compressor 46 to evaporator 45 through a bypass line 53 controlled by a solenoid operated valve 54. A conventional thermostatic element 55 for establishing cyclic operation of motor-compressor 46 comprises a single-pole single-throw switch 56 and a sensing bulb 60 disposed in high heat exchange relation with evaporator 45. A second thermostat 61 comprises a single-pole single-throw switch 62 and a feeler bulb 63 also disposed in high heat exchange relation with evaporator 45. Switch 62 comprises a switch arm 64 and a "cold" contact C'. A bias heater element 65 is disposed in high heat exchange relation with feeler bulb 63.

As was the case in the embodiment of FIGURE 1, the arm of switch 56 and contact 57 are disposed in series electrical circuit with motor-compressor 46 and a source of energy as provided by line L'. The arm of switch 56 is also disposed in series electrical circuit with line L', contact 57, switch arm 64, contact C', and solenoid valve 54, the latter connected as shown to the line L'. Heater element 65 is connected at its one terminal to the switch arm 64 and at its other terminal to cold contact C'.

As respects operation of this embodiment, and assuming the motor-compressor operation has been initiated from a warm condition of the refrigerator, switch 56 will be closed and switch arm 64 is out of contact with cold contact C' whereby heater element 65 is energized to prevent movement of arm 64 to the cold contact. Energization of the heater element takes place, as in the embodiment shown in FIGURE 1, by virtue of the current path provided from the line L' through switches 55, 62, and the solenoid coil of valve 54. Under this condition of operation bypass valve 54 is closed due to insufficient voltage drop across its solenoid coil. When the refrigerator storage compartments 43, 44 and evaporator 45 have been cooled sufficiently, switch 56 will open to deenergize motor compressor 46 and heater element 65. Upon deenergization of heater element 65, the thermal mass, or "residual cold" as expressed elsewhere, of the evaporator is sufficient to lower the temperature of the feeler bulb 60 and effect operation of switch arm 64 to engage cold contact C'. Therefore, when the evaporator again warms up a sufficient amount to call for refrigeration, switch 56 will close, thereby energizing motor compressor 46 and solenoid valve 54 to open the bypass circuit, under which condition hot gaseous refrigerant is delivered to the evaporator to defrost the same. When defrosting has been completed, as determined by an appropriate upper temperature limit, switch arm 64 will be moved away from cold position C', whereby valve 54 is deenergized to close the same and heater element 65 is energized. The cycle will then continue as noted before.

It will be appreciated that once-per-cycle defrosting is achieved by the apparatus of the invention without need for complicated timing or cycle counting devices, or the like. Whereas the invention has been shown and described as embodied in a hot gas defrost system, it will be further appreciated that a similar pair of control elements, and a similar bias heater element, may be used in a defrost system utilizing an electrical heat source, with a suitable modification of the electrical circuit. The foregoing, as well as other modifications of the invention, may be made without departing from the scope of the appended claims.

I claim:

1. In a refrigerating system: a cooling element; control means for maintaining cyclic operation of said cooling element between predetermined upper and lower temperature limits; means for defrosting said cooling element during the cyclic operations thereof; and temperature responsive means for controlling said means for defrosting comprising a thermostatic element operative when the cooling element is at a below-defrosting temperature to energize said means for defrosting, said thermostatic element further being operative to deenergize said means for defrosting at a temperature prevailing when the frost has been removed, and heater means energizable upon deenergization of the means for defrosting, said heater means being positioned and adapted to heat said thermostatic element and maintain the same in a non-defrost initiating position for the remainder of an operating cycle.

2. A refrigeration system according to claim 1, and further characterized in that said cooling element comprises a refrigerant evaporator, and said system includes a valve, operative upon energization of said means for defrosting, to introduce hot gaseous refrigerant into said evaporator to defrost the same.

3. In a refrigeration system: a cooling element; control means for maintaining cyclic operation of said cooling element between predetermined upper and lower temperature limits; means for defrosting said cooling element during each cycle of operation thereof; and thermostatically actuated means for controlling said means for defrosting comprising temperature responsive means operative when the cooling element is at a below-defrosting temperature to energize said means for defrosting, said temperature responsive means further being operative to deenergize said means for defrosting at a temperature prevailing when the frost has been removed, and an electrical heater energizable upon deenergization of the means for defrosting to maintain said thermostatically actuated element in a non-defrost initiating position for the remainder of an operating cycle.

4. A refrigeration system comprising: cyclically energizable and deenergizable cooling means; temperature responsive control means for effecting cyclic operation of the cooling means; means for defrosting said cooling means during one of the periods of cyclic operation; thermostatically actuated means including a control element to provide for energization of said means for defrosting when said cooling means is at a below-defrosting temperature, said control element being operative, upon attaining a temperature which prevails upon completion of defrost, to deenergize the means for defrosting and to accommodate initiation of a refrigeration period within the mentioned operating cycle; and bias heater means disposed in high heat exchange relation with said control element and operative to maintain a predetermined elevated temperature of the latter, preventing resetting the control element to a defrosting position, as the temperature of the cooling element is lowered in the course of the mentioned refrigeration period.

5. A refrigeration system according to claim 4, and further characterized in that said cooling element comprises the evaporator of a vapor compression refrigerating system including a motor-compressor, a condenser, and a restrictor disposed in series refrigerant flow circuit with said evaporator, and said means for defrosting includes a refrigerant circuit bypassing said restrictor whereby to provide for flow of hot gaseous refrigerant from the motor-compressor to the evaporator and a valve to control said bypass circuit, energization of said means for defrosting being effected by opening said valve to permit flow of hot gaseous refrigerant from said compressor to said evaporator to defrost the same, said means for defrosting being deenergizable by closing said valve.

6. In a refrigeration system including defrostable cooling means adapted for cyclic operation, and means for defrosting the cooling means, control means for providing the recited defrosting period in the course of the cyclic operations of the cooling means comprising: a first thermostatically actuated element operative to energize and deenergize said cooling means to provide such cyclic operation; thermostatically actuated defrosting control means operative to energize said means for defrosting and comprising a second thermostatically actuated element having a bias heater associated therewith, said heater being energizable in response to simultaneous operation of said first thermostatically operated element to its refrigerating position and said second thermostatically operated element to its non-defrosting position upon completion of defrosting, whereby defrosting of the cooling means is halted, refrigeration is initiated and subsequent movement of said second thermostatically actuated element to its defrosting position is prevented as energization of the cooling means is continued.

7. In a refrigeration system of the type having elements including a compressor, a condenser, a restrictor, and an evaporator connected in series flow circuit, and means for bypassing said restrictor and adapted to deliver to said evaporator hot gaseous refrigerant flowing from said compressor, control means comprising: a passage communicating with the discharge side of said compressor and with said evaporator; valve means constructed and located to control flow through said passage; a first thermostatically actuated element responsive to the evaporator temperature and operative at a higher temperature limit to effect operation of said compressor and at a predetermined lower temperature limit to effect deenergization of said compressor; a second thermostatically operated element operative to open and close said valve upon operation of said compressor, and in response to a predetermined higher temperature value of said evaporator, respectively; and a heater element disposed in thermal exchange relation with said second thermostatically actuated element and operative upon completion of defrosting and closing of said valve, to maintain said second thermostatically actuated element in its non-defrosting position, the construction and arrangement being such that upon deenergization of the compressor said heater element is deenergized whereby said second thermostatically actuated element is permitted to reset to its defrosting position.

8. A refrigeration system comprising: a compressor, a condenser, a restrictor, an evaporator connected in series flow circuit; means bypassing said restrictor and adapted to deliver to said evaporator hot gaseous refrigerant flowing from said compressor; refrigerant flow control means including a valve constructed and located to control flow through said bypass means and operative, when the compressor is operating, to provide modified flow of hot gaseous refrigerant through said bypass means into said evaporator for a time period sufficient to defrost the latter, said valve further being operative automatically after such period, to close said bypass means and to establish normal flow of refrigerant through said condenser and said restrictor thereby to effect cooling of said evaporator; a first thermostatically actuated element responsive to the evaporator temperature and operative at an upper temperature limit to effect operation of said compressor and at a predetermined lower temperature limit to effect deenergization of said compressor; a second thermostatically actuated element operative to open said valve upon initiation of operation of said compressor and to close said valve in response to a predetermined higher temperature value of said evaporator; and a heater element disposed in thermal exchange relation with said second thermostatically operated element and operative upon cessation of defrosting and closing of said valve to maintain said second thermostatically actuated element in its nondefrosting position, the construction and arrangement being such that upon cessation of operation of the compressor said heater element is deenergized whereby said second thermostatically actuated element is permitted to reset to its defrosting position.

References Cited in the file of this patent
UNITED STATES PATENTS

| | | |
|---|---|---|
| 2,531,136 | Kurtz | Nov. 21, 1950 |
| 2,928,256 | Nonomaque | Mar. 15, 1960 |
| 2,988,896 | Swart | June 20, 1961 |